(12) United States Patent
Oka et al.

(10) Patent No.: US 8,562,261 B2
(45) Date of Patent: Oct. 22, 2013

(54) END MILL

(75) Inventors: Hisao Oka, Itami (JP); Tatsuya Shino, Itami (JP); Kazuo Maeda, Itami (JP)

(73) Assignee: Sumitomo Electric Hardmetal Corp., Itami-Shi, Hyogo (JP)

( * ) Notice: Subject to any disclaimer, the term of this patent is extended or adjusted under 35 U.S.C. 154(b) by 779 days.

(21) Appl. No.: 12/665,193

(22) PCT Filed: Mar. 23, 2009

(86) PCT No.: PCT/JP2009/055612
§ 371 (c)(1),
(2), (4) Date: Dec. 17, 2009

(87) PCT Pub. No.: WO2009/122937
PCT Pub. Date: Oct. 8, 2009

(65) Prior Publication Data
US 2010/0196108 A1 Aug. 5, 2010

(30) Foreign Application Priority Data
Mar. 31, 2008 (JP) ................................. 2008-089892

(51) Int. Cl.
*B23C 5/10* (2006.01)

(52) U.S. Cl.
USPC ................. 407/61; 407/60; 407/54; 408/227

(58) Field of Classification Search
USPC ............. 407/34, 53, 54, 56, 60, 61; 408/227, 408/230
IPC ........................................................ B23C 5/10
See application file for complete search history.

(56) References Cited

U.S. PATENT DOCUMENTS 725,374 A * 4/1903 Shaw ............................ 408/229
2,360,425 A * 10/1944 Kinzbach ..................... 166/55.3
(Continued)

FOREIGN PATENT DOCUMENTS

DE         3602419 A1     7/1987
DE        37 42 942 C1    12/1988
(Continued)

OTHER PUBLICATIONS

German Office Action for corresponding DE Application No. 11 2009 000 013.4-14, dated Aug. 23, 2010, pp. 1-5.
(Continued)

*Primary Examiner* — Andrea Wellington
*Assistant Examiner* — Sara Addisu
(74) *Attorney, Agent, or Firm* — Ditthavong Mori & Steiner, P.C.

(57) ABSTRACT

An end mill includes first cutting edges which spiral in a direction defining a positive helix angle and second cutting edges which spiral in a direction defining a negative helix angle, the first cutting edges and the second cutting edges being disposed at positions shifted in a circumferential direction. The first cutting edges and the second cutting edges are each configured to be continuous over an effective cutting edge length. At an axially forward end of the end mill, a first phase angle between one of the first cutting edges and its adjacent second cutting edge located adjacent to the first cutting edges in an opposite direction to a tool rotation direction is set to be different from a second phase angle between the second cutting edge and its adjacent first cutting edge located adjacent to the second cutting edges in the opposite direction to the tool rotation direction.

10 Claims, 8 Drawing Sheets

(56) References Cited

U.S. PATENT DOCUMENTS

| | | | | |
|---|---|---|---|---|
| 2,855,657 | A | * | 10/1958 | Erhardt ............................ 407/63 |
| 3,058,199 | A | * | 10/1962 | Cave et al. ....................... 407/54 |
| 3,736,634 | A | * | 6/1973 | Sonnie ............................ 407/54 |
| 3,863,316 | A | * | 2/1975 | Yeo ................................. 407/54 |
| 3,913,196 | A | * | 10/1975 | Maday ............................. 407/54 |
| 3,947,143 | A | * | 3/1976 | Gulla .............................. 408/230 |
| 4,212,568 | A | * | 7/1980 | Minicozzi ........................ 407/53 |
| 4,227,837 | A | * | 10/1980 | Yodoshi .......................... 407/53 |
| 4,285,618 | A | * | 8/1981 | Shanley, Jr. ..................... 407/54 |
| 4,475,850 | A | * | 10/1984 | Penoza et al. ................... 407/54 |
| 4,480,949 | A | * | 11/1984 | Van De Bogart ............... 407/54 |
| 4,507,028 | A | * | 3/1985 | Matsushita ..................... 408/230 |
| 4,572,714 | A | * | 2/1986 | Suzuki et al. .................. 408/230 |
| 4,721,421 | A | * | 1/1988 | Klinger .......................... 407/63 |
| 4,810,136 | A | * | 3/1989 | Paige .............................. 407/54 |
| 4,988,241 | A | * | 1/1991 | Colligan ......................... 407/51 |
| 5,094,573 | A | * | 3/1992 | Hougen ......................... 409/132 |
| 5,221,163 | A | * | 6/1993 | Nishimura ...................... 407/53 |
| 5,685,673 | A | * | 11/1997 | Jarvis ............................. 408/230 |
| 5,779,399 | A | * | 7/1998 | Kuberski ........................ 407/54 |
| 5,800,101 | A | * | 9/1998 | Jindai et al. ................... 408/230 |
| 6,164,876 | A | * | 12/2000 | Cordovano ..................... 407/59 |
| 6,345,941 | B1 | * | 2/2002 | Fang et al. ...................... 409/74 |
| 6,991,409 | B2 | * | 1/2006 | Noland ........................... 407/63 |
| 7,367,754 | B1 | * | 5/2008 | Greenwood et al. ............ 407/63 |
| 7,367,758 | B2 | * | 5/2008 | Turrini et al. .................. 408/230 |
| 7,544,021 | B2 | * | 6/2009 | Flynn ............................. 407/59 |
| 2003/0118411 | A1 | * | 6/2003 | Flynn et al. ..................... 407/53 |
| 2004/0120777 | A1 | * | 6/2004 | Noland ........................... 407/63 |
| 2005/0031421 | A1 | | 2/2005 | Inglis |
| 2006/0045637 | A1 | * | 3/2006 | Flynn ............................. 407/53 |
| 2006/0188345 | A1 | * | 8/2006 | Greenwood et al. ........... 407/54 |
| 2011/0217132 | A1 | * | 9/2011 | Wells et al. .................... 407/54 |

FOREIGN PATENT DOCUMENTS

| | | |
|---|---|---|
| DE | 297 15 192 U1 | 1/1998 |
| DE | 203 04 580 U1 | 8/2004 |
| DE | 10 2006 022 572 A1 | 11/2007 |
| GB | 2184373 A * | 6/1987 |
| JP | 54-119198 A | 9/1979 |
| JP | 60085818 A * | 5/1985 |
| JP | 61-142009 A | 6/1986 |
| JP | 63-47007 A | 2/1988 |
| JP | 2-256412 A | 10/1990 |
| JP | 4-47910 U | 4/1992 |
| JP | 2000-246728 A | 9/2000 |
| WO | WO 2004/082874 A1 | 9/2004 |
| WO | WO 2009/122937 A1 | 10/2009 |

OTHER PUBLICATIONS

International Search Report for PCT/JP2009/055612, dated Jun. 2, 2009, pp. 1-5.

Evidence: Declaration in lieu of an oath by Frank Engel, including enclosures.

Evidence: Invoice of the Opponent to the Company IAC Group BV dated Mar. 31, 2006.

Opposition for related German Patent Application No. 11 2009 000 013.4 dated Nov. 6, 2012, pp. 1-25.

Notification of Reasons for Rejection for corresponding Japanese Patent Application No. 2009-537344 dated Jun. 4, 2013, 5 pages.

* cited by examiner (a)

(b)

(c)

(d)

END MILL

CROSS-REFERENCE TO RELATED APPLICATION

The present application is a national phase application of PCT Application No. PCT/JP2009/055612, filed on Mar. 23, 2009, and claims priority to Japanese Application No. JP2008-089892, filed on Mar. 31, 2008, the entire contents of which are herein incorporated by reference.

TECHNICAL FIELD

The present invention relates to end mills used for cutting, slotting, plunging, and the like of fiber-reinforced composite materials typified by fiber-reinforced plastics, metal materials, etc.

BACKGROUND ART

Fiber-reinforced composite materials, in particular, carbon fiber-reinforced composite materials (hereinafter referred to as the CFRPs) using carbon fibers are effective in reducing the weight of structures, and their demand has been increasing in airplanes, automobiles, etc. in expectation of improvement in fuel efficiency due to reduction in weight. A CFRP is produced by laminating and integrating layers of a prepreg obtained by impregnating a fabric of carbon fibers or a material composed of unidirectionally oriented carbon fibers with a resin. In a CFRP panel or the like, a peripheral portion becomes a region having an unstable quality because of the production process. Therefore, a method is employed in which a member is fabricated so as to include such a region as an extra peripheral portion in advance, and after the resin is cured, the extra peripheral portion is cut off to obtain a product.

In such a case, a water-jet method and an end-mill method are known as the method for cutting the extra peripheral portion. While the latter method in which an end mill is used is advantageous in that large-scale equipment is not required, an existing processing machine can be used, and the extra peripheral portion can be cut off without preparing pilot holes, a short end-mill life is a problem.

In order to increase the end-mill life, an end mill coated with a high-hardness coating (e.g., a diamond coating) has been employed. Since a CFRP is a material for which burrs easily occur, even when the abrasion of the cutting edge is considered to be at a level that does not cause a problem in metal machining, burrs occur in CFRP machining, and the tool (end mill) is determined to have reached the end of its life at that moment. Therefore, even in an end mill coated with a high-hardness coating, the end mill life is short in CFRP machining.

Furthermore, CFRPs used for fuselages, wings, etc. of airplanes are large in size in many cases, and fixing of such large workpieces easily becomes unstable because fixing points are limited during machining. Therefore, so-called "work chatter" occurs during machining, which results in damage to tool edges. This also shortens the tool life, and the short tool life results in an increase in the processing costs.

In this regard, Patent Ref 1 described below discloses a rotary cutting tool in which, in order to suppress the occurrence of burrs in machining of a fiber-reinforced composite material, inserts are mounted on a top of a shank, the inserts including right-handed helical cutting edges and left-handed helical cutting edges, and the right-handed helical cutting edges and the left-handed helical cutting edges are disposed alternately in the circumferential direction.

[Patent Reference 1] Japanese Unexamined Patent Application Publication No. 61-142009

DISCLOSURE OF INVENTION

Problems to be Solved by the Invention

In the rotary cutting tool disclosed in Patent Ref 1, the right-handed helical cutting edges and the left-handed helical cutting edges are disposed in a stepped arrangement in the axial direction so that the upper portion and the lower portion of a region to be machined are cut separately with the two types of cutting edges. The cutting forces in the upper portion and the lower portion of the region to be machined are directed toward the center in the thickness direction of the workpiece so that the occurrence of burrs is suppressed. However, in this tool, since the upper portion and the lower portion of the region to be machined are separately cut with the right-handed helical cutting edges and the left-handed helical edges, suppression of burrs is not sufficient.

It is an object of the present invention to effectively suppress the occurrence of burrs in machining with an end mill.

Means for Solving the Problems

In order to solve the problems described above, an end mill according to the present invention includes first cutting edges which spiral in a direction defining a positive helix angle and second cutting edges which spiral in a direction defining a negative helix angle, the first cutting edges and the second cutting edges being disposed at positions shifted in a circumferential direction. The first cutting edges and the second cutting edges are each configured to be continuous over an effective cutting edge length, and at a tool top, a phase angle between one of the first cutting edges and its adjacent second cutting edge located toward the back in a tool rotation direction is set to be different from a phase angle between the second cutting edge and its adjacent first cutting edge located toward the back in the tool rotation direction. The first cutting edges and the second cutting edges may be arranged alternately in the circumferential direction, or may be arranged irregularly, for example, in the order of first cutting edge-second cutting edge-second cutting edge-first cutting edge.

Preferred embodiments of the end mill are listed below.

(1) The end mill in which, at the tool top, the phase angle between one of the first cutting edges and its adjacent second cutting edge located toward the back in the tool rotation direction is set larger than the phase angle between the second cutting edge and its adjacent first cutting edge located toward the back in the tool rotation direction.

(2) The end mill in which the helix angle of the first cutting edges is set larger than the helix angle of the second cutting edges.

(3) The end mill in which the helix angle of the first cutting edges is set at +3° to +10°, and the helix angle of the second cutting edges is set at −3° to −10°.

(4) The end mill in which at least one of the first cutting edges is provided with an end cutting edge which extends from an outermost periphery of the end mill to a position exceeding a tool rotation center.

(5) The end mill in which either the first cutting edges or the second cutting edges are provided with nicks or both of the first cutting edges and the second cutting edges are provided with nicks.

Advantages

In the end mill according to the present invention, the phase angle (at the tool top) between one of the first cutting edges and its adjacent second cutting edge located toward the back in the tool rotation direction is set to be different from the phase angle (at the tool top) between the second cutting edge and its adjacent first cutting edge located toward the back in the tool rotation direction. Therefore, it is possible to configure each of the first cutting edges and the second cutting edges to be continuous over the effective cutting edge length, the first cutting edges and the second cutting edges, which spiral in opposite directions, not being crossed with each other. By configuring each of the first cutting edges and the second cutting edges to be continuous, cutting proceeds smoothly and discontinuous engagement of the cutting edges in the workpiece can be prevented, thus making the occurrence of burrs difficult. Furthermore, the first cutting edges having a positive helix angle mainly play a role of cutting. When cutting is performed with a cutting edge having a positive helix angle, it is difficult to sufficiently reduce the occurrence of burrs. In particular, burrs easily occur on the upper surface side of the workpiece where a cutting force is applied in a direction opposite to a direction toward the center in the thickness direction of the workpiece. However, even if burrs occur due to cutting with a cutting edge having a positive helix angle, subsequent complementary cutting with a cutting edge having a negative helix angle removes the resulting burrs. Thus, a cut surface having a small number of burrs can be obtained, and high quality machining is made possible.

Furthermore, the cutting force in the axial direction of each of the cutting edges having a positive helix angle and the cutting force in the axial direction of each of the cutting edges having a negative helix angle are directed in opposite directions and counteract each other. In addition, since the phase angle between one of the first cutting edges and its adjacent second cutting edge located toward the back in the tool rotation direction is set to be different from the phase angle between the second cutting edge and its adjacent first cutting edge located toward the back in the tool rotation direction, the cutting period of each of the first cutting edges is different from the cutting period of each of the second cutting edges. Therefore, chattering during machining does not easily occur, and the occurrence of chipping or the like of the tool edges due to chattering is suppressed, which is effective in improving the tool life.

Such an effect is particularly noticeable in the case where fixing of a workpiece easily becomes unstable, for example, in the case where a large workpiece is machined.

In the end mill in which the phase angle between one of the first cutting edges and its adjacent second cutting edge located toward the back in the tool rotation direction is set larger than the phase angle between the second cutting edge and its adjacent first cutting edge located toward the back in the tool rotation direction, the amount of back metal in the first cutting edge portion can be increased compared to an end mill which does not satisfy such a requirement, and edge strength can be easily ensured. The phase angle between the first cutting edge and its adjacent second cutting edge located toward the back in the tool rotation direction gradually decreases toward the rear end (side close to the shank). However, according to the structure of the present invention, since the distance between the first cutting edge and the second cutting edge is increased at the top side, the distance between the cutting edges is also increased at the rear side, and it is also possible to sufficiently secure the amount of back metal of the first cutting edge at the rear side of the cutting edge.

In the end mill in which the helix angle of the first cutting edges is set larger than the helix angle of the second cutting edges, a decrease in the amount of back ooooometal of the first cutting edges due to an increase in the helix angle of the first cutting edges can be compensated for by a decrease in the helix angle of the second cutting edges. Consequently, while maintaining the edge strength of the first cutting edges, it is possible to enhance the cutting quality of the first cutting edges.

In addition, in the end mill having an end cutting edge which extends exceeding the tool rotation center, it is possible to perform slotting and plunging. Furthermore, when the first cutting edges and the second cutting edges are alternately disposed in the circumferential direction, cutting with a cutting edge having a positive helix angle and complementary cutting for deburring with a cutting edge having a negative helix angle are alternately performed, which is preferable. Even if cutting edges which spiral in the same direction are continuously disposed in the circumferential direction, the object of the present invention is achieved.

Furthermore, although the advantages described above can also be obtained when the end mill according to the present invention is used for machining of metal materials, particularly noticeable advantages can be obtained when the present invention is applied to machining of fiber-reinforced composite materials.

Furthermore, in the end mill in which the first cutting edges and/or the second cutting edges are provided with nicks, cutting forces during machining can be reduced. In the end mill according to the present invention, the helix angle of cutting edges is set small compared with the commonly used end mills. Even in such a structure, by providing nicks on the cutting edges so as to decrease cutting forces, the effect of suppressing burrs can be enhanced. In the case where surface roughness in side machining is taken into consideration, preferably, either the first cutting edges or the second cutting edges are provided with the nicks, and more preferably, the first cutting edges having a positive helix angle and bearing a large cutting load are provided with the nicks.

Figure 1:
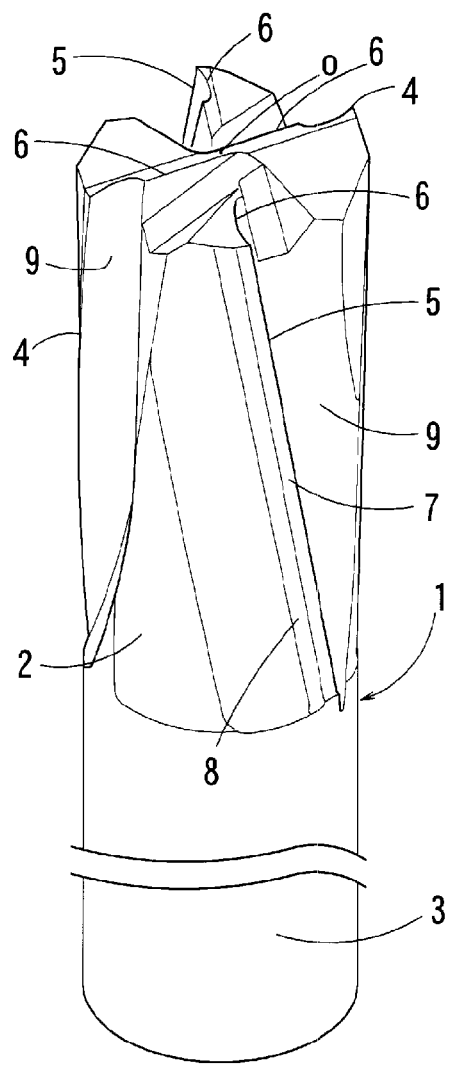
FIG. 1 is a perspective view which shows an end mill according to a first embodiment of the present invention.

REFERENCE NUMERALS 1 end mill
2 main body
3 shank
4 first cutting edge
5 second cutting edge
6 end cutting edge
7 first flank
8 second flank
9 helical flute
10 workpiece
11 burr
12 nick
P1 phase angle between first cutting edge and its adjacent second cutting edge located toward the back in the tool rotation direction
P2 phase angle between second cutting edge and its adjacent first cutting edge located toward the back in the tool rotation direction
A upper edge of workpiece
B lower edge of workpiece
θ1 helix angle of first cutting edge
θ2 helix angle of second cutting edge
L effective cutting edge length

BEST MODE FOR CARRYING OUT THE INVENTION

End mills according to the embodiments of the present invention will be described with reference to the accompanying FIGS. 1 to 13. FIGS. 1 to 5 show a first embodiment in which the present invention is applied to a solid-type, four-edged end mill, and FIGS. 6 to 10 show a second embodiment in which the present invention is applied to a solid-type, six-edged end mill. Furthermore, FIGS. 11 and 12 relate to a third embodiment in which the present invention is applied to a solid-type, four-edged end mill.

Although the present invention is basically valid when applied to end mills having two or more cutting edges, it is advantageous to apply the present invention to end mills having a larger number of cutting edges in view of high-efficiency machining and tool life. In the case of an end mill having a diameter D of about 6 mm to 12 mm, which is usually often used, from the viewpoint of securing the strength of cutting edges, the upper limit of the number of cutting edges is believed to be about 6 edges.

Each of the end mills 1 includes a main body 2 and a shank 3 which is integrally connected to the rear end of the main body 2. In each of the end mills, first cutting edges 4 having a positive helix angle θ1 {refer to FIGS. 4, 9, 11(c), and 12(c)} and second cutting edges 5 having a negative helix angle θ2 {refer to FIGS. 3, 8, 11(d), and 12(d)} are disposed alternately in the circumferential direction on the periphery of the main body 2. Furthermore, an end cutting edge 6 is disposed on the top of the main body 2.

Reference numeral 7 represents a first flank formed along each of the cutting edges, reference numeral 8 represents a second flank, and reference numeral 9 represents a helical groove for chip removal. The helix angle of the first cutting edge 4 (which is the same as the helix angle θ1) is set larger than the helix angle of the second cutting edge 5 (which is the same as the helix angle θ2). End mills which are composed of a sintered hard alloy or the like and the surface of which is coated with a hard coating, such as a diamond coating, are particularly excellent in durability.

Figure 2:
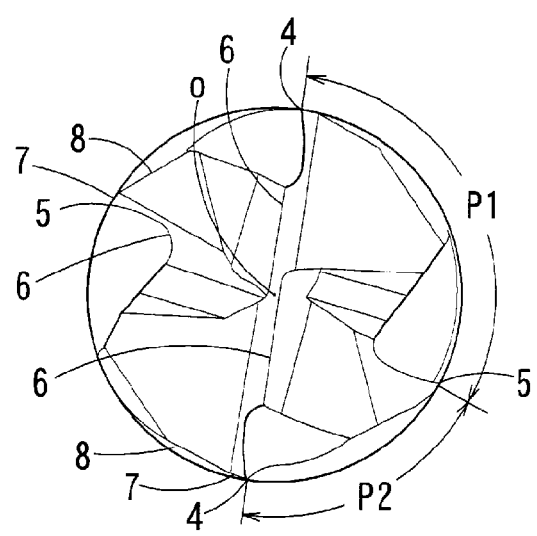
FIG. 2 is a bottom view of the end mill shown in FIG. 1.
Figure 3:
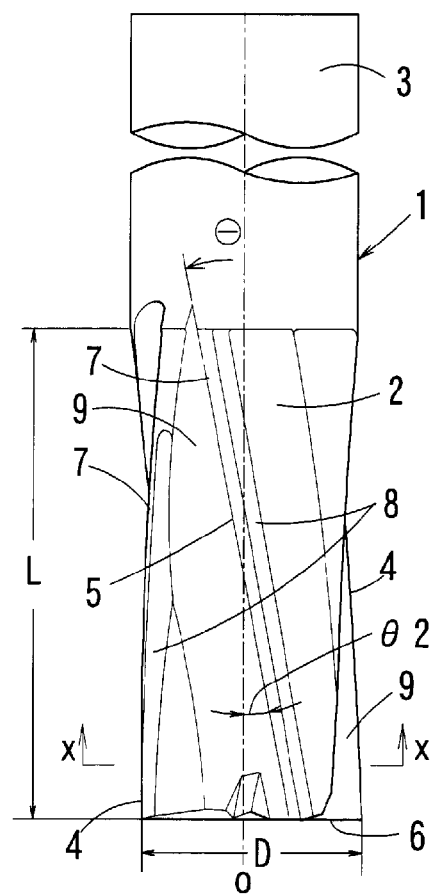
FIG. 3 is a front view of the end mill shown in FIG. 1.
Figure 4:
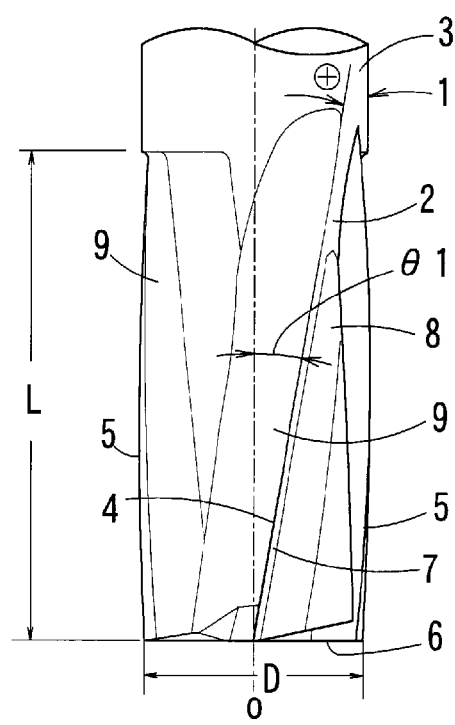
FIG. 4 is a side view of the end mill shown in FIG. 1.
Figure 5:
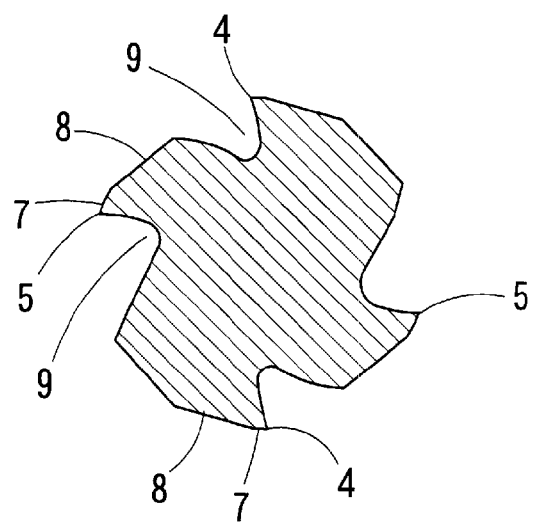
FIG. 5 is a cross-sectional view taken along the line X-X of FIG. 3.
Figure 6:
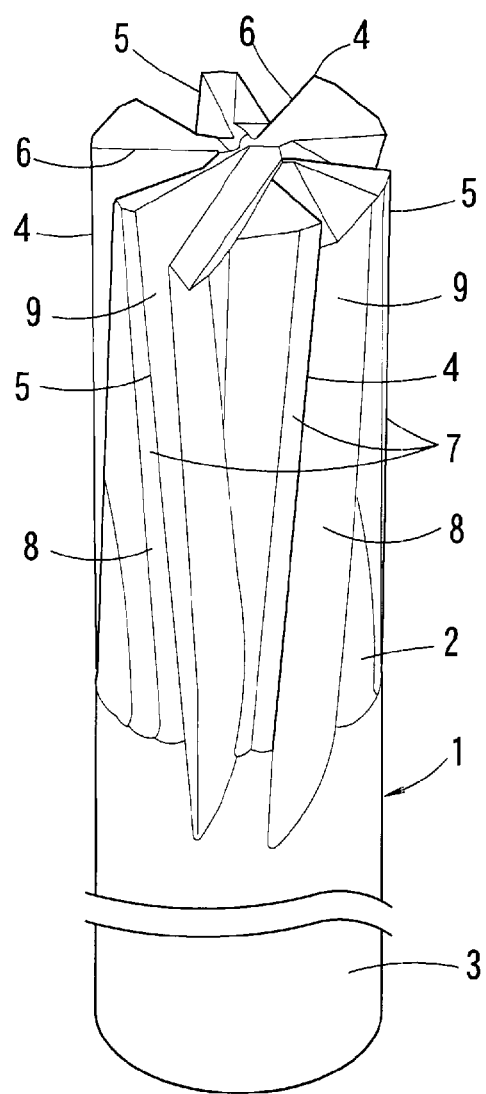
FIG. 6 is a perspective view which shows an end mill according to a second embodiment of the present invention.
Figure 7:
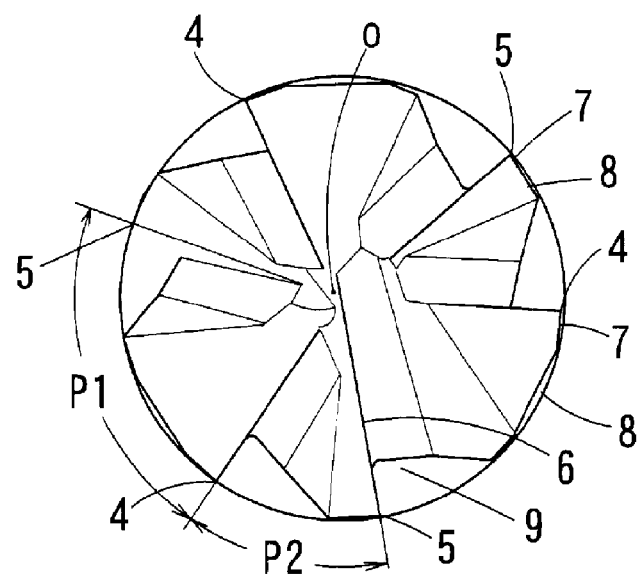
FIG. 7 is a bottom view of the end mill shown in FIG. 6.
Figure 8:
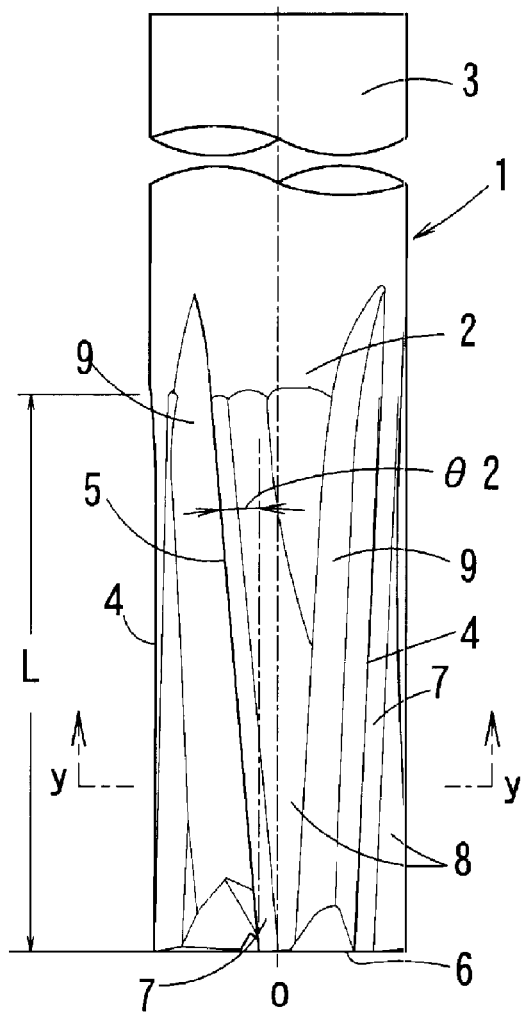
FIG. 8 is a front view of the end mill shown in FIG. 6.
Figure 9:
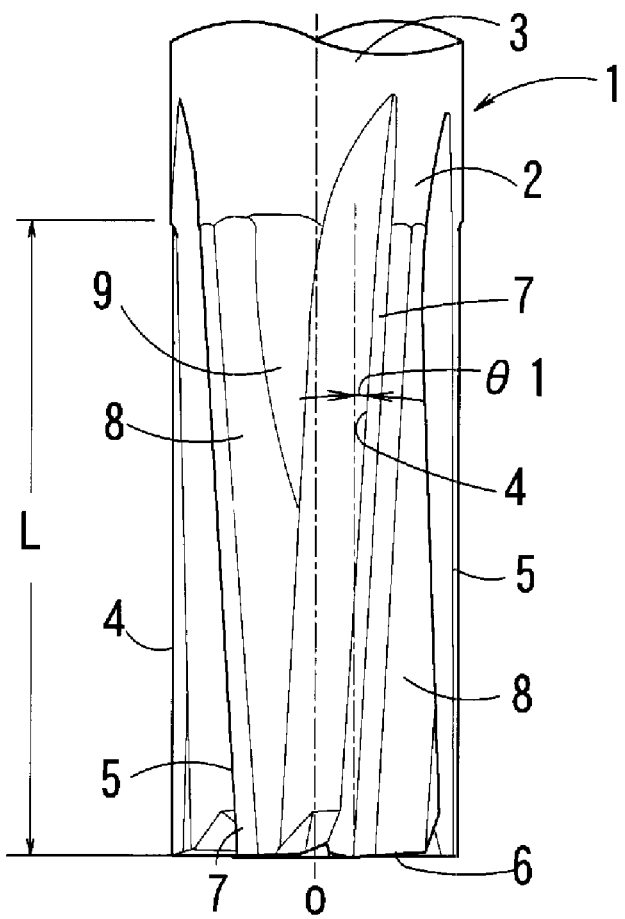
FIG. 9 is a side view of the end mill shown in FIG. 6.
Figure 10:
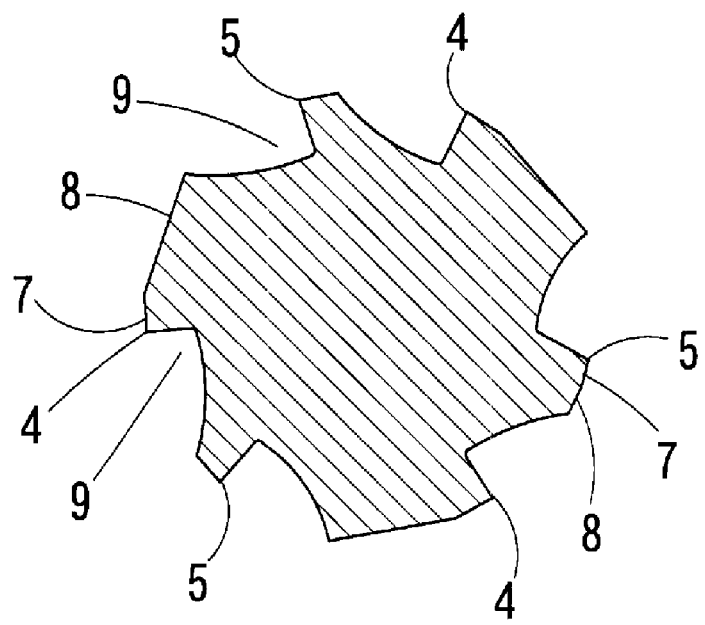
FIG. 10 is a cross-sectional view taken along the line y-y of FIG. 8.

In each of the end mills 1 shown, the first cutting edges 4 are right-handed helical and the second cutting edges 5 are left-handed helical. The cutting edges 4 and 5 are each configured to be continuous over an effective cutting edge length L (not shown for the third embodiment; being set at about twice the diameter D of the end mill). Furthermore, at the tool top, the phase angle P1 {refer to FIGS. 2, 7, 11(b), and 12(b)} between one of the first cutting edges 4 and its adjacent second cutting edge 5 located toward the back in the tool rotation direction is set to be different from the phase angle P2 between the second cutting edge 5 and its adjacent first cutting edge 4. The phase angles P1 and P2 are phase angles at the tool top. Here, the relationship P1>P2 is satisfied. Furthermore, in each of the four-edged end mills according to the first and third embodiments, as shown in FIGS. 2, 11(b), and 12(b), the first cutting edges 4 are each provided with an end cutting edge 6 which extends from the outermost periphery to a position exceeding a tool rotation center O. In the six-edged end mill according to the second embodiment, as shown in FIG. 7, an end cutting edge 6 is provided so as to extend from the top end of any given first cutting edge 4 to a position exceeding a tool rotation center O.

Furthermore, in the end mill according to the third embodiment, the cutting edges are provided with nicks 12. Many nicks 12 are provided at a constant pitch in a longitudinal direction of each cutting edge. By means of the nicks 12, chips are broken into small fragments, and as a result, cutting forces during machining are decreased.

Figure 11:
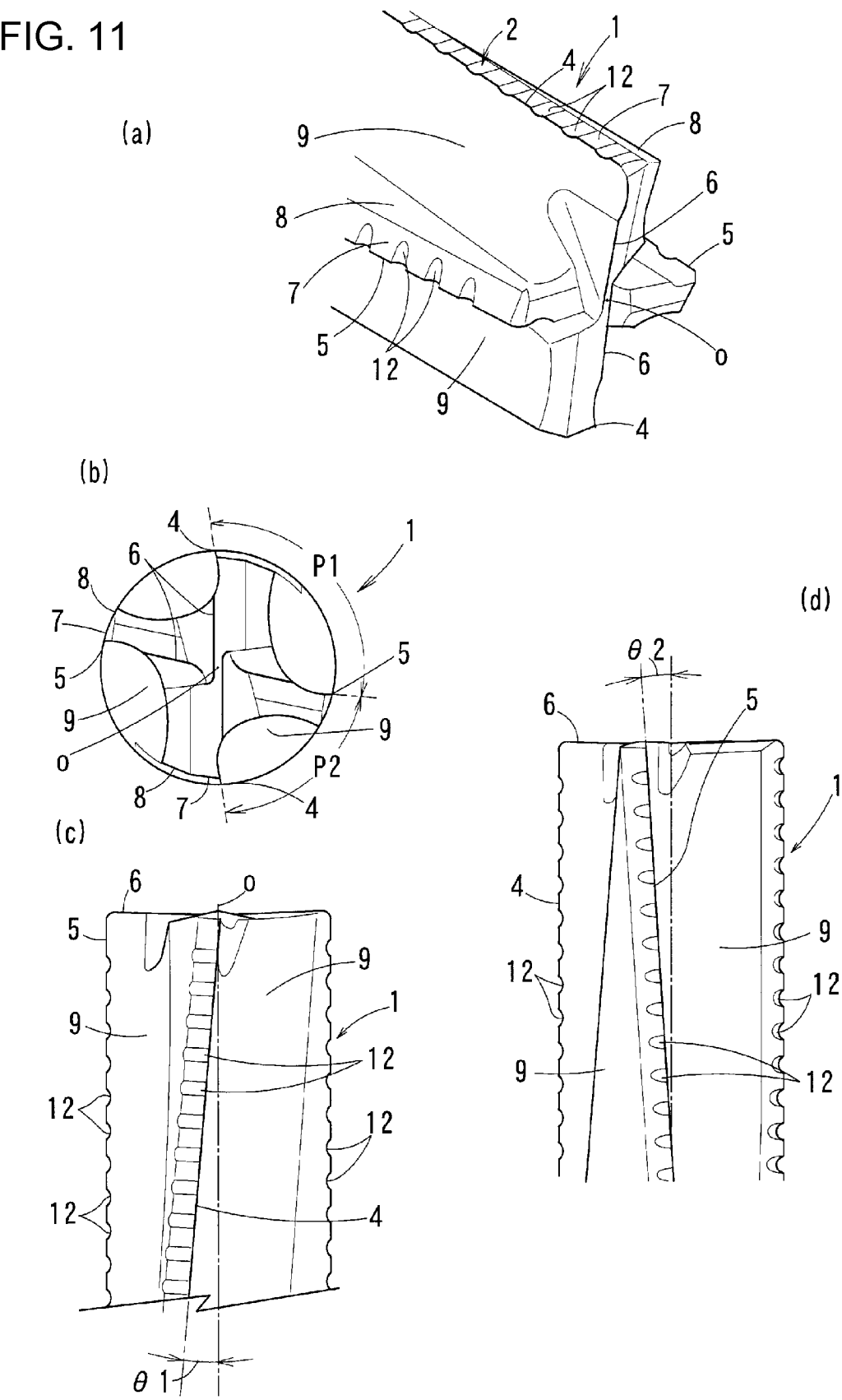
FIG. 11(a) is a perspective view which shows the substantial part of an end mill according to a third embodiment of the present invention.
FIG. 11(b) is a front view of the end mill.
FIG. 11(c) is a side view of the first cutting edge side of the end mill.
FIG. 11(d) is a side view of the second cutting edge side of the end mill.
Figure 12:
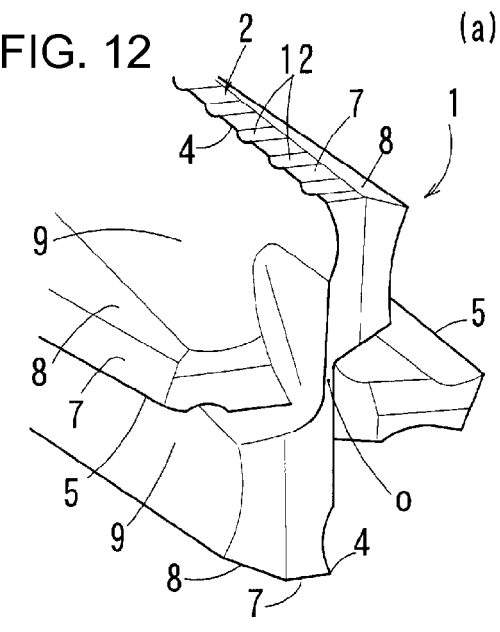
FIG. 12(a) is a perspective view which shows the substantial part of an end mill according to a modification example of the third embodiment of the present invention.
FIG. 12(b) is a front view of the end mill.
FIG. 12(c) is a side view of the first cutting edge side of the end mill.
FIG. 12(d) is a side view of the second cutting edge side of the end mill.
Figure 12:
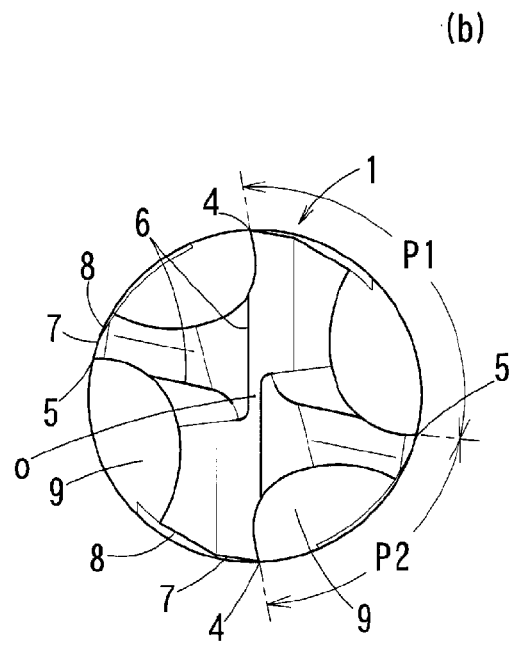
Figure 12:
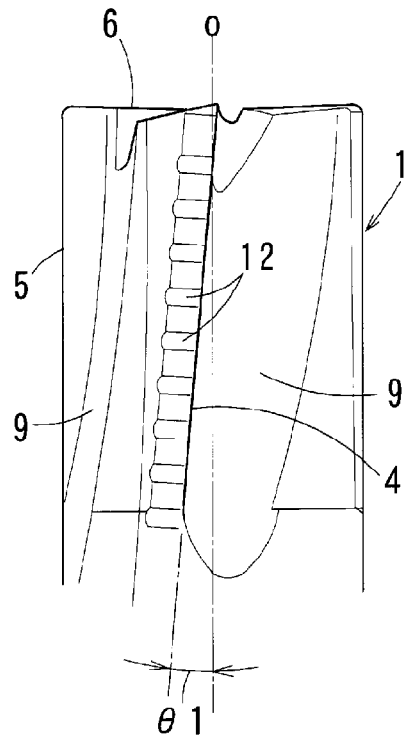
Figure 12:
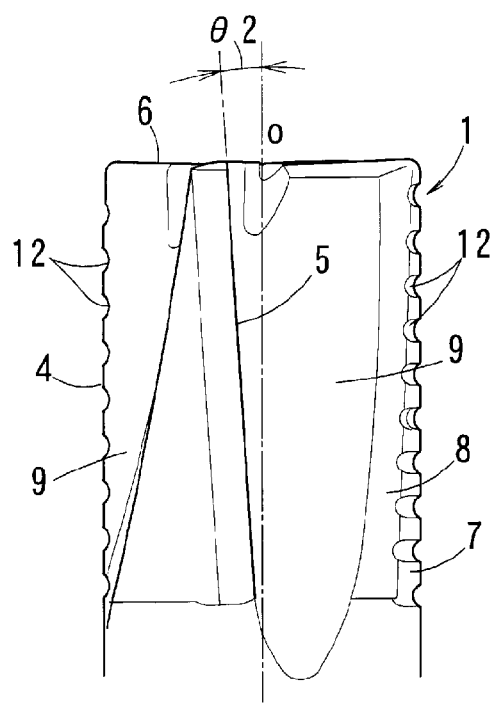
Figure 13:
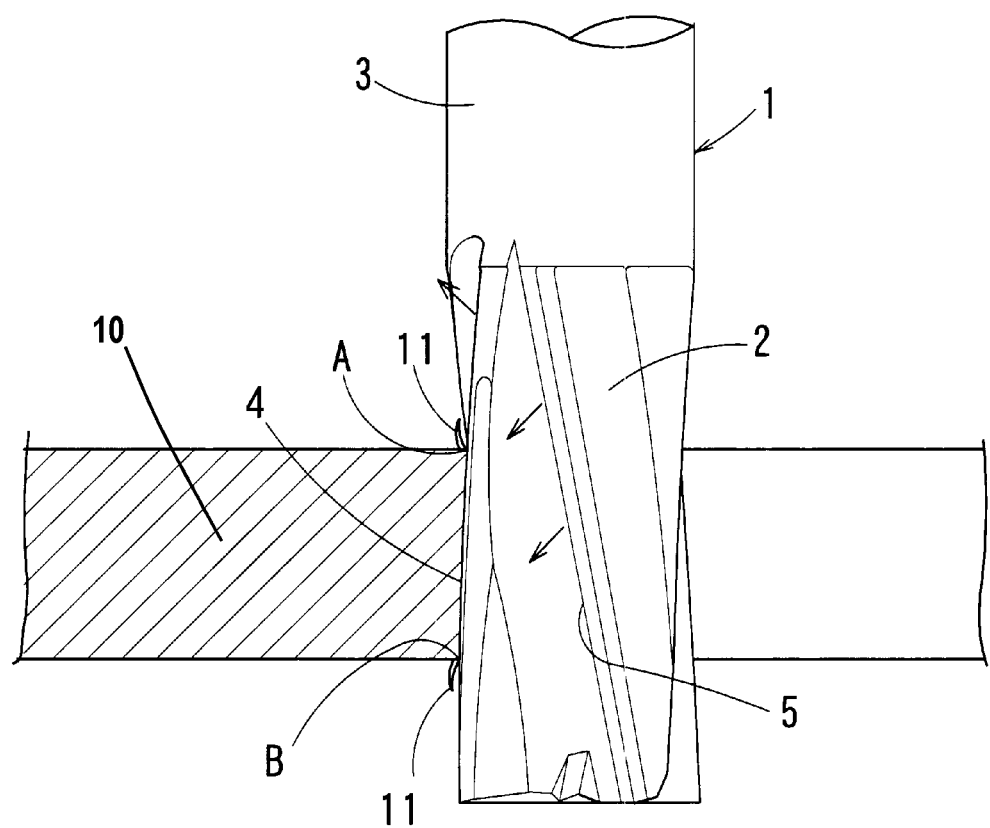
FIG. 13 is a view illustrating a cutting process by an end mill according to the present invention.

As shown in FIG. 11, when nicks 12 are provided on both the first cutting edges 4 and the second cutting edges 5, a larger effect of decreasing cutting forces during machining is expected. By providing nicks 12 on either the first cutting edges 4 or the second cutting edges 5, surface roughness in side machining can be improved using a wiper effect of the cutting edges not provided with nicks. In such a case, as shown in FIG. 12, the nicks 12 are preferably provided on the first cutting edges 4 because the first cutting edges 4 having a positive helix angle have a larger cutting load than the second cutting edges 5 having a negative helix angle and are more likely to induce chattering and because the second cutting edges 5 have a small cutting load and are suitable as wiper edges.

In the end mill according to each of the first to third embodiments, the same region of a workpiece is machined with the first cutting edges 4 and the second cutting edges 5. In this case, the right-handed helical first cutting edges 4 mainly play a role of cutting, and the left-handed helical second cutting edges 5 perform complementary cutting operations for deburring. Since the first cutting edges 4 have a positive helix angle, at the edge (point A in FIG. 13) of the upper surface of a workpiece (fiber-reinforced composite material) 10 shown in FIG. 13, a cutting force is applied in a direction departing from the center in the thickness direction of the workpiece, i.e., an upward cutting force is applied in FIG. 13. Consequently, in particular, at the point A, a burr 11 easily occurs due to cutting with the first cutting edge 4. A burr 11 also occurs at the edge (point B in FIG. 13) of the lower surface of the workpiece 10. The burrs 11 are removed by cutting with the second cutting edge 5 in which a cutting force is applied toward the center in the thickness direction of the workpiece 10. Cutting with the first cutting edge 4 and subsequent deburring with the second cutting edge 5 are repeated, and cutting is performed in which occurrence of burrs is reduced. Thus, high quality machining is made possible.

As described above, in the end mill according to the present invention, the phase angle P1 between one of the first cutting edges 4 and its adjacent second cutting edge 5 located toward the back in the tool rotation direction is set to be different from the phase angle P2 between the second cutting edge 5 and its adjacent first cutting edge 4 located toward the back in the tool rotation direction. Therefore, it is possible to configure each of the first cutting edges 4 and the second cutting edges 5 to be continuous over the effective cutting edge length, the first cutting edges 4 and the second cutting edges 5, which spiral in opposite directions, not being crossed with each other. By employing the continuous cutting edges, cutting proceeds smoothly. Furthermore, the cutting force in the axial direction of each of the first cutting edges 4 and the cutting force in the axial direction of each of the second cutting edges 5 are directed in opposite directions and counteract each other. In addition, since the phase angle P1 between one of the first cutting edges 4 and its adjacent second cutting edge located toward the back in the tool rotation direction is set to be different from the phase angle P2 between the second cutting edge 5 and its adjacent first cutting edge located toward the back in the tool rotation direction, the cutting period of each of the first cutting edges 4 is different from the cutting period of each of the second cutting edges 5. Due to the synergistic effect of these factors, chattering during machining is suppressed, and the occurrence of chipping, delamination of coatings, or the like of the tool edges due to chattering is reduced. Thus, the effect of improving the tool life is further enhanced.

Furthermore, with respect to the phase angles P1 and P2, the relationship P1>P2 is satisfied. Consequently, the amount of back metal located toward the back in the rotation direction of the first cutting edge 4 can be increased, compared to an end mill which does not satisfy such a requirement, and even at the rear end side of the first cutting edge where the distance between the first cutting edge 4 and the second cutting edge 5 becomes small, it is possible to sufficiently secure the edge strength of the first cutting edge 4.

Furthermore, the helix angle of the first cutting edges 4 is set larger than the helix angle of the second cutting edges 5, and a decrease in the amount of back metal of the first cutting edges due to an increase in the helix angle of the first cutting edges 4 can be compensated for by a decrease in the helix angle of the second cutting edges 5. Consequently, while maintaining the edge strength of the first cutting edges 4, it is possible to enhance the cutting quality of the first cutting edges 4.

Meanwhile, preferably, the helix angle of the first cutting edges 4 is 3° to 10°. When the helix angle is less than 3°, the first cutting edges 4 and the second cutting edges 5 become close to linear. Consequently, impact occurs when the cutting edges are engaged in the workpiece, and the effect of suppressing the occurrence of burrs is decreased. Furthermore, the helix angle may be more than 10° from the standpoint of cutting performance. However, as the helix angle of the cutting edges increases, forces that try to lift the workpiece are applied more strongly to the workpiece. Therefore, the preferred upper limit of the numerical value is 10°, and the upper limit of the helix angle is preferably 15° or less at the largest.

The end cutting edge 6 is not an essential element, for example, in trimming of an extra peripheral portion of the workpiece. When an end mill is provided with an end cutting edge 6 the inner end of which extends to a position exceeding a tool rotation center, slotting and plunging can be performed, thus increasing the use of the end mill.

EXAMPLES

In order to evaluate the performance of end mills according to the present invention, a four-edged end mill in which the helix angle $\theta 1$ of first cutting edges was set at 5° and the helix angle $\theta 2$ of second cutting edges was set at −4° and a six-edged end mill in which the helix angles of first cutting edges and second cutting edges were set as above (each being an inventive product having a diameter $\phi$ of 12 mm and an effective cutting edge length of 25 mm) were experimentally produced, and their cutting performance was compared with conventional products. As the conventional products, four-edged and six-edged end mills having helix angles of 0° and 30° and having a commonly used shape, and a four-edged end mill in which right-handed helical cutting edges and left-handed helical cutting edges were disposed in a stepped manner in the axial direction so that the upper portion and the lower portion of a region to be machined were cut separately with the two types of cutting edges, were used. In the four-edged inventive product, referring to FIG. 2, the phase angle P1 was about 108° and the phase angle P2 was about 72°. Furthermore, in the six-edged inventive product, referring to FIG. 7, the phase angle P1 was about 75° and the phase angle P2 was about 44°. In each of a four-edged end mill and a six-edged end mill, when a configuration is used in which P1=P2, the first and second cutting edges come close to each other excessively at the rear end side, and it is not possible to sufficiently secure the amount of back metal of the first cutting edges at the rear end side. However, in the configuration described above, such a problem did not arise.

Using these samples, an extra peripheral portion of a CFRP was cut off, the CFRP having 8 prepreg laminated layers and a total thickness of 8 mm. Cutting was performed under the following conditions: cutting speed V=250 m/min, feed f=0.03 mm/tooth, and total cutting length: 15 m.

The cutting state by the inventive products was monitored with a high-speed camera. As a result, it was confirmed that occurrence of burrs and removal of burrs were repeated, and growth of burrs with the time of use of the tool was small. Furthermore, the amount of chattering of the workpiece during machining was small, the cutting sound was small, and cutting was performed quietly.

In contrast, with respect to the comparative products, in each of the tools, growth of burrs with the time of use was observed, and chatter vibration sounding like metallic sound occurred due to work chatter during cutting.

The experimental results show effectiveness of the features in which cutting edges having a positive helix angle and cutting edges having a negative helix angle are alternately disposed and in which the cutting edges are each configured to be continuous over the effective cutting edge length.

The invention claimed is:
1. An end mill comprising first cutting edges which spiral in a direction defining a positive helix angle and second cutting edges which spiral in a direction defining a negative helix angle, the first cutting edges and the second cutting edges being disposed at positions shifted in a circumferential direction,
    wherein the first cutting edges and the second cutting edges are each configured to be continuous over an effective cutting edge length,
    wherein, at an axially forward end of the end mill, a first phase angle between one of the first cutting edges and its adjacent second cutting edge located adjacent to the first cutting edges in an opposite direction to a tool rotation direction is set to be different from a second phase angle between the second cutting edge and its adjacent first cutting edge located adjacent to the second cutting edges in the opposite direction to the tool rotation direction, wherein the first cutting edges and the second cutting edges are disposed alternately in the circumferential direction, wherein the first phase angle between one of the first cutting edges and its adjacent second cutting edge located adjacent to the one first cutting edge in the opposite direction to the tool rotation direction is set larger than the second phase angle between the second cutting edge and its adjacent first cutting edge located adjacent to the second cutting edge in the opposite direction to the tool rotation direction, wherein the helix angle of the first cutting edges is set larger than the helix angle of the second cutting edges, and wherein the helix angle of the first cutting edges is set at 3° to 10°, and the helix angle of the second cutting edges is set at −3° to −10°.

2. The end mill according to claim 1, wherein the first cutting edges are provided with nicks.

3. The end mill according to claim 2, wherein the second cutting edges are provided with nicks.

4. An end mill comprising first cutting edges which spiral in a direction defining a positive helix angle and second cutting edges which spiral in a direction defining a negative helix angle, the first cutting edges and the second cutting edges being disposed at positions shifted in a circumferential direction, wherein the first cutting edges and the second cutting edges are each configured to be continuous over an effective cutting edge length, wherein, at an axially forward end of the end mill, a first phase angle between one of the first cutting edges and its adjacent second cutting edge located adjacent to the first cutting edges in an opposite direction to a tool rotation direction is set to be different from a second phase angle between the second cutting edge and its adjacent first cutting edge located adjacent to the second cutting edges in the opposite direction to the tool rotation direction, and wherein at least one of the first cutting edges is provided with an end cutting edge which extends from an outermost periphery of the end mill to a position exceeding a tool rotation center.

5. The end mill according to claim 4, wherein the first cutting edges and the second cutting edges are disposed alternately in the circumferential direction.

6. The end mill according to claim 4, wherein the first phase angle between one of the first cutting edges and its adjacent second cutting edge located adjacent to the one first cutting edge in the opposite direction to the tool rotation direction is set larger than the second phase angle between the second cutting edge and its adjacent first cutting edge located adjacent to the second cutting edge in the opposite direction to the tool rotation direction.

7. The end mill according to claim 4, wherein the helix angle of the first cutting edges is set larger than the helix angle of the second cutting edges.

8. The end mill according to claim 4, wherein the helix angle of the first cutting edges is set at 3° to 10°, and the helix angle of the second cutting edges is set at −3° to −10°.

9. The end mill according to claim 4, wherein the first cutting edges are provided with nicks.

10. The end mill according to claim 9, wherein the second cutting edges are provided with nicks.

* * * * *